United States Patent
Santee et al.

(10) Patent No.: US 10,467,007 B1
(45) Date of Patent: Nov. 5, 2019

(54) CORE FOR CONTROLLING MULTIPLE SERIAL PERIPHERAL INTERFACES (SPI'S)

(71) Applicant: BAE Systems Information and Electronic Systems Integration Inc., Nashua, NH (US)

(72) Inventors: Steven G Santee, Bristow, VA (US); Jane O Gilliam, Centreville, VA (US); Dale A Rickard, Manassas, VA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 15/995,303

(22) Filed: Jun. 1, 2018

Related U.S. Application Data

(60) Provisional application No. 62/542,347, filed on Aug. 8, 2017.

(51) Int. Cl.
| | |
|---|---|
| G06F 3/00 | (2006.01) |
| G06F 9/30 | (2018.01) |
| G06F 9/38 | (2018.01) |
| G06F 9/52 | (2006.01) |
| G06F 15/173 | (2006.01) |
| G06F 15/17 | (2006.01) |
| G06F 15/76 | (2006.01) |

(52) U.S. Cl.
CPC ........ *G06F 9/30087* (2013.01); *G06F 9/3881* (2013.01); *G06F 9/52* (2013.01); *G06F 15/17* (2013.01); *G06F 15/17325* (2013.01); *G06F 15/76* (2013.01); *G06F 2015/763* (2013.01)

(58) Field of Classification Search
None
See application file for complete search history.

(56) References Cited

U.S. PATENT DOCUMENTS

| | | | |
|---|---|---|---|
| 2010/0131801 A1* | 5/2010 | Baleani | G06F 11/1641 714/37 |
| 2015/0254198 A1* | 9/2015 | Anderson | G06F 13/364 710/110 |

* cited by examiner

*Primary Examiner* — Henry Tsai
*Assistant Examiner* — Dean Phan
(74) *Attorney, Agent, or Firm* — Maine Cernota & Rardin; Scott J. Asmus

(57) ABSTRACT

A core suitable for inclusion in an ASIC or other integrated circuit includes a plurality of SPI masters, each of which is able to control and coordinate the timing of a plurality of SPI-controlled devices via an associated SPI bus. Each SPI master is controlled by a corresponding core controller that includes memory, interrupts, flags, timers, and an instruction processor that can independently execute instructions stored in the memory to control data communication between the core controller and its associated SPI master, and between the SPI master and one or more SPI slave devices. The core controllers can be simultaneously started, resynchronized, staggered, and otherwise coordinated with each other. Embodiments further permit bypassing of the core controllers for direct data exchange between external resources and the SPI masters.

9 Claims, 8 Drawing Sheets

| ADDR | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| 0x0000 | reserved ||||||||||||||||| COND_STOP |||||||| START_NSTOP ||||
| 0x0004 | WE 7 | GP Flags 7 ||| WE 6 | GP Flags 6 ||| WE 5 | GP Flags 5 ||| WE 4 | GP Flags 4 ||| WE 3 | GP Flags 3 ||| WE 2 | GP Flags 2 ||| WE 1 | GP Flags 1 ||| WE 0 | GP Flags 0 |||
| 0x0008-0x000C | reserved |||||||||||||||||||||||||||||||
| 0x0010 | reserved |||||||||| HW_INTERRUPT_FLAGS |||||||| SW_INTERRUPT_FLAGS |||||||| DONE_FLAGS ||||||||
| 0x0014 | reserved |||||||||| HW_INTERRUPT_FLAGS_ENABLE |||||||| SW_INTERRUPT_FLAGS_ENABLE |||||||| DONE_FLAGS_ENABLE ||||||||
| 0x0018 | HW INTS7 ||| HW INTS6 ||| HW INTS5 ||| HW INTS4 ||| HW INTS3 ||| HW INTS2 ||| HW INTS1 ||| HW INTS0 |||
| 0x001C | HW INTS EN7 ||| HW INTS EN6 ||| HW INTS EN5 ||| HW INTS EN4 ||| HW INTS EN3 ||| HW INTS EN 2 ||| HW INTS EN1 ||| HW INTS EN0 |||
| 0x0020 | CORE0_TIMER |||||||||||||||| CORE0_PC |||||||| CORE0_START_ADDR ||||||||
| 0x0024 | CORE1_TIMER |||||||||||||||| CORE1_PC |||||||| CORE1_START_ADDR ||||||||
| 0x0028 | CORE2_TIMER |||||||||||||||| CORE2_PC |||||||| CORE2_START_ADDR ||||||||
| 0x002C | CORE3_TIMER |||||||||||||||| CORE3_PC |||||||| CORE3_START_ADDR ||||||||
| 0x0030 | CORE4_TIMER |||||||||||||||| CORE4_PC |||||||| CORE4_START_ADDR ||||||||
| 0x0034 | CORE5_TIMER |||||||||||||||| CORE5_PC |||||||| CORE5_START_ADDR ||||||||
| 0x0038 | CORE6_TIMER |||||||||||||||| CORE6_PC |||||||| CORE6_START_ADDR ||||||||
| 0x003C | CORE7_TIMER |||||||||||||||| CORE7_PC |||||||| CORE07_START_ADDR ||||||||
| 0x0040-0x1FFC | reserved |||||||||||||||||||||||||||||||
| 0x2000-0x23FC | Instruction/Data Storage RAM for Core Controller 0 |||||||||||||||||||||||||||||||
| 0x2400-0x27FC | Instruction/Data Storage RAM for Core Controller 1 |||||||||||||||||||||||||||||||
| 0x2800-0x2BFC | Instruction/Data Storage RAM for Core Controller 2 |||||||||||||||||||||||||||||||
| 0x2C00-0x2FFC | Instruction/Data Storage RAM for Core Controller 3 |||||||||||||||||||||||||||||||
| 0x3000-0x33FC | Instruction/Data Storage RAM for Core Controller 4 |||||||||||||||||||||||||||||||

FIG. 4

| | |
|---|---|
| 0x3400- 0x37FC | Instruction/Data Storage RAM for Core Controller 5 |
| 0x3800- 0x3BFC | Instruction/Data Storage RAM for Core Controller 6 |
| 0x3C00- 0x3FFC | Instruction/Data Storage RAM for Core Controller 7 |
| 0x4000- 0x7FFC | Reserved |
| 0x8000- 0x83FC | eSPI Core 0 Access |
| 0x8400- 0x87FC | eSPI Core 1 Access |
| 0x8800- 0x8BFC | eSPI Core 2 Access |
| 0x8C00- 0x8FFC | eSPI Core 3 Access |
| 0x9000- 0x93FC | eSPI Core 4 Access |
| 0x9400- 0x97FC | eSPI Core 5 Access |
| 0x9800- 0x9BFC | eSPI Core 6 Access |
| 0x9C00- 0x9FFC | eSPI Core 7 Access |

FIG. 4 (cont.)

| Description | Name | ADDR |
|---|---|---|
| Control Reg | CONTROL | 0x0000 |
| Gen Purpose Flag | GP_FLAG | 0x0004 |
| Reserved | | 0x0008-0x000C |
| Status Reg | STATUS | 0x0010 |
| Int Enable Reg | INT-ENABLE | 0x0014 |
| HW Int Reg | HW_INT | 0x0018 |
| HW Int En Reg | HW_INT_ENABLE | 0x001C |
| Core0 Reg | CORE0 | 0x0020 |
| Core1 Reg | CORE1 | 0x0024 |
| Core2 Reg | CORE2 | 0x0028 |
| Core3 Reg | CORE3 | 0x002C |
| Core4 Reg | CORE4 | 0x0030 |
| Core5 Reg | CORE5 | 0x0034 |
| Core6 Reg | CORE6 | 0x0038 |
| Core7 Reg | CORE7 | 0x003C |
| Reserved | | 0x0040-0x1FFC |
| Core 0 Instr RAM | IDSRAM0 | 0x2000-0x23FC |
| Core 1 Instr RAM | IDSRAM1 | 0x2400-0x27FC |
| Core 2 Instr RAM | IDSRAM2 | 0x2800-0x2BFC |
| Core 3 Instr RAM | IDSRAM3 | 0x2C00-0x2FFC |
| Core 4 Instr RAM | IDSRAM4 | 0x3000-0x33FC |
| Core 5 Instr RAM | IDSRAM5 | 0x3400-0x37FC |

FIG. 4 (cont.)

| | | |
|---|---|---|
| Core 6 Instr RAM | IDSRAM6 | 0x3800-0x3BFC |
| Core 7 Instr RAM | IDSRAM7 | 0x3C00-0x3FFC |
| Reserved | | 0x4000-0x7FFC |
| Core 0 Access | ACCESS0 | 0x8000-0x83FC |
| Core 1 Access | ACCESS1 | 0x8400-0x87FC |
| Core 2 Access | ACCESS2 | 0x8800-0x8BFC |
| Core 3 Access | ACCESS3 | 0x8C00-0x8FFC |
| Core 4 Access | ACCESS4 | 0x9000-0x93FC |
| Core 5 Access | ACCESS5 | 0x9400-0x97FC |
| Core 6 Access | ACCESS6 | 0x9800-0x9BFC |
| Core 7 Access | ACCESS7 | 0x9C00-0x9FFC |

FIG. 4 (cont.)

| Instruction | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| Core Reg Write | 0 | 0 | 0 | 0 | 0 | reserved ||||||||| Core Register Addr(7:0) |||||||| I/DS RAM Addr |||||||
| Core FIFO Write | 0 | 0 | 0 | 0 | 1 | reserved | EN | # chars ||||| bits/char ||| reserved |||||||| I/DS RAM Addr |||||||
| Core Reg Read | 0 | 0 | 0 | 1 | 0 | reserved ||||||||| Core Register Addr(7:0) |||||||| I/DS RAM Addr |||||||
| Core FIFO Read | 0 | 0 | 0 | 1 | 1 | reserved | EN | # chars ||||| bits/char ||| reserved |||||||| I/DS RAM Addr |||||||
| DMA Write | 0 | 0 | 1 | 0 | 0 | reserved ||||||| External Addr (OCB Addr) |||||||| # words ||||||| 0 | I/DS RAM Addr |||||||
| DMA Read | 0 | 0 | 1 | 1 | 1 | reserved ||||||| External Addr (OCB Addr) |||||||| # words ||||||| 0 | I/DS RAM Addr |||||||
| Start Timer | 0 | 1 | 0 | 0 | 0 | reserved |||||| Timer Divide ||| Start Value |||||||||||||||
| Stop Timer | 0 | 1 | 0 | 0 | 1 | reserved |||||||||||||||||||||||
| Capture Timer | 0 | 1 | 0 | 1 | 0 | reserved |||||||||||||||| I/DS RAM Addr |||||||
| Clear SW Interrupt | 0 | 1 | 1 | 0 | 0 | reserved | 0 | reserved ||||||||||||||||||||
| Set SW Interrupt | 0 | 1 | 1 | 0 | 0 | reserved | 1 | reserved ||||||||||||||||||||
| Write GP Flags | 0 | 1 | 1 | 0 | 1 | Enables |||| r | Flag Values |||| reserved ||||||||||||||||
| Wait for Timer | 1 | 0 | 0 | 0 | 0 | reserved ||||||||| Value |||||||||||||||
| Wait for GP Flag | 1 | 0 | 0 | 0 | 1 | Enables |||| r | Flag Values |||| reserved ||||||||||||||||
| Jump | 1 | 1 | 0 | 0 | 0 | reserved |||||||||||||||| I/DS RAM Addr |||||||
| Stop | 1 | 1 | 1 | 1 | 0 | reserved |||||||||||||||||||||||
| Stop Conditionally | 1 | 1 | 1 | 1 | 1 | reserved |||||||||||||||||||||||

CORE FOR CONTROLLING MULTIPLE SERIAL PERIPHERAL INTERFACES (SPI'S)

RELATED APPLICATIONS

This application claims the benefit of U.S. Provisional Application No. 62/542,347, filed Aug. 8, 2017, which is herein incorporated by reference in its entirety for all purposes.

FIELD

The invention relates to devices that include embedded systems, and more particularly, to application specific integrated circuits that control embedded systems.

BACKGROUND

Many electronic systems incorporate a plurality of small embedded devices, such as sensors, analog to digital converters, and digital to analog converters, which are controlled by Serial Peripheral Interfaces (SPIs), each of which is controlled by an SPI "master." In some cases, these systems require precise timing and/or synchronous operation between the embedded, SPI-controlled devices, for example if multiple sensors need to be sampled simultaneously.

However, a standard SPI master can only communicate with one embedded device at a time. Of course, a plurality of SPI masters can be included in the system. However, it can be difficult to coordinate and synchronize the timing of the SPI masters, and therefore it can be difficult to control and coordinate the timing of the SPI-controlled embedded devices. For instance, SPI controlled devices can operate with a wide variety of control and data word bit lengths and variable timing, which requires compensating command timing to achieve simultaneous sampling of multiple types of ADCs or simultaneous driving of multiple types of DACs.

What is needed, therefore, is an apparatus for controlling and coordinating the timing of a plurality of SPI-controlled devices included in an electronic system.

SUMMARY

A core suitable for inclusion in an application specific integrated circuit (ASIC) or other integrated circuit is disclosed that is able to control and coordinate the timing of a plurality of SPI-controlled (serial-peripheral-interface-controlled) devices. It should be noted that, for ease of expression by example, reference is sometimes made herein to incorporation of the disclosed core in an "ASIC." However, it will be understood that the disclosed core is not limited to inclusion in an ASIC, but can be included in any integrated circuit that requires coordinated timing and control of a plurality of SPI-controlled devices.

The disclosed core, referred to herein as the Multi enhanced-SPI Handler (MeSH) core, contains a plurality of SPI masters, each of which is configured to initiate and control traffic on a corresponding Serial Peripheral Interface (SPI) bus for control of external serial peripheral interface devices. In embodiments, the SPI masters are referred to as "SPI cores," and in some embodiments as "enhanced" SPI cores, or eSPI cores. In embodiments, each of the eSPI cores can communicate with a plurality of SPI "slave" devices, for example up to four slaves.

According to the present disclosure, each of the SPI cores is controlled by a corresponding core controller, also referred to herein as an "eSPI Core controller," that is also included in the MeSH core. The core controllers function as independent programmable devices that separately control their corresponding eSPI cores. As such, the eSPI core controllers include memory, interrupts, flags, timers, interfaces, and processors that are able to execute instructions stored in their memories. In embodiments, the eSPI core controllers further provide "bypass" access so that external resources can directly access the eSPI cores.

In embodiments, the MeSH core can contain up to eight core controllers and eight corresponding SPI cores. The remainder of the MeSH core is devoted primarily to providing communication between the cores and core controllers and resources external to the MeSH core as well as providing registers that can be used for monitoring, controlling, and synchronizing the core controllers and cores. Embodiments are disclosed herein by example with reference to communication between the MeSH core and an "On Chip Bus" (OCB) and/or "OCB memory space." However, it will be understood that these terms are used as examples only, and refer generically to all resources that are external to the MeSH core that may require communication with the eSPI cores and/or core controllers, whether such external resources are on the ASIC or other integrated circuit that includes the MeSH core or are external thereto.

According to the present disclosure, the core controllers can be started and/or reset and/or restarted separately or simultaneously. Once it is started, each core controller begins executing its stored instructions, thereby communicating with and controlling the SPI cores and thereby the SPI slave devices. In embodiments, the MeSH core further enables "bypass" data transfer directly between the on-chip bus (OCB) memory space and the SPI cores, and from thence to the SPI slave devices.

In exemplary embodiments, the MeSH core includes a MeSH bridge that incorporates the eSPI core controllers as well as interface elements that control and direct the flow of instructions and data between the cores and core controllers and the OCB bus and/or other external resources. In some of these embodiments, these interface elements include master, master arbiter, and slave blocks that communicate with corresponding OCB master (OCBMI) and OCB slave (OCB SI) interfaces. In some of these embodiments, the OCBMI is a 64-bit interface and the OCBSI is a 32-bit interface.

As noted above, each of the eSPI core controllers can independently control its corresponding SPI core by executing instructions that are stored in its memory. The core controllers are also able to synchronize their transactions by exchanging signals with each other. In embodiments, is also possible for external resources to directly synchronize transactions among multiple eSPI core controllers and/or to bypass the core controllers and to interrogate and issue commands directly to the eSPI cores.

In embodiments, the instruction set of the eSPI core controllers includes:

Writes and reads to/from corresponding eSPI core resources;
Writes and reads to/from OCB memory space;
Timer control (start, stop, capture);
Set and Clear of interrupt;
Write of General Purpose Flags;
Wait instructions (for Timer or General Purpose Flags);
Stop (immediate and conditional); and
Jump.

Additional features included in various embodiments are:
Independent instruction execution by each eSPI Core controller to control of each associated eSPI core;

Timer capability of the eSPI core controllers to stagger instruction operation of any eSPI core controller with any other eSPI core controller;

At least one common register, included for example in the slave block, that can be used to start all core controllers (e.g. to synchronize the core controllers, if desired);

A set of general purpose flags, included for example in the slave block, which can also be used to report execution progress or resynchronize activity between the eSPI core controllers;

Multi-tier status reporting with individual interrupt enables on each bit, including for example a first tier in the master and/or slave block, a second tier in the core controllers, and a third tier in the eSPI cores; and Bypass capability that allows direct access by external resources (e.g. via an OCB) to eSPI core resources.

Data Transfer capabilities of the MeSH Core in embodiments include:

eSPI core controller endianness control to swap bits/bytes as needed by the eSPI Core;

256×32 Instruction/Data Storage RAM in each eSPI Core Controller for control of a corresponding eSPI Core; and OCB Access to the host device, including:
a. 64-bit OCB master connection for MeSH core initiated data transfer with the Instruction/Data Storage RAM of the eSPI controllers; and
b. 32-bit OCB slave connection for data transfers initiated by external resources.

The present disclosure is a Multi-Serial Peripheral Interface controlling (MeSH) core suitable for inclusion in an integrated circuit. The core includes a plurality of Serial Peripheral Interface (SPI) buses suitable for control of serial peripheral interface devices that are external to the MeSH controlling core, for each of the SPI buses, an SPI master dedicated to controlling the SPI bus, for each of the SPI masters, an SPI core controller dedicated to controlling the SPI master, a bridge interconnecting the SPI core controllers, and a control interface configured to provide data and instruction communication between the bridge and resources that are exterior to the MeSH controlling core.

Each of the SPI core controllers includes memory, at least one interrupt, at least one timer, and an instruction processor that is able to execute instructions stored in the memory, said instructions belonging to a core controller instruction set. And each of the SPI core controllers, under control of instructions from said instruction set, is able to transfer data between the SPI core controller and a corresponding SPI master, coordinate activities of the SPI core controller with activities of other SPI core controllers in the MeSH core, and cause a plurality of the SPI core controllers to commence synchronized execution of the instructions stored therein.

In embodiments, the MeSH core includes eight SPI masters. In any of the above embodiments, each of the SPI masters can be able to control up to four SPI slave devices.

In any of the above embodiments, the core controller instruction set can include instructions that are further able to stagger instruction operations of any of the SPI masters with any other of the SPI masters.

Any of the above embodiments can further include a common register that can operate to initiate program execution of any combination of the core controllers so as to synchronize the core controllers with each other.

Any of the above embodiments can further include at least one general purpose flag that is able to report execution progress of at least one of the core controllers.

Any of the above embodiments can further include at least one general purpose flag that can be used to resynchronize activity between a plurality of the core controllers.

In any of the above embodiments, the MeSH core can be configured to enable direct bypass communication between at least one of the SPI masters and at least one resource that is exterior to the MeSH core. And in some of these embodiments the bypass communication is possible only at times when there is no data communication between the SPI master and its associated core controller.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 4 is an address map of an eSPI core controller in an embodiment; and

FIG. 5 is a list of instruction codes included in the eSPI core controller instruction set in an embodiment.

DETAILED DESCRIPTION

A core suitable for inclusion in an application specific integrated circuit (ASIC) or other integrated circuit is disclosed that is able to control and coordinate the timing of a plurality of SPI-controlled (serial-peripheral-interface-controlled) devices. The disclosed core is referred to herein as the "Multiple enhanced SPI Handler" core, or "MESH" core. It should be noted that, for ease of expression by example, reference is made herein to incorporation of the disclosed core in an "ASIC." However, it will be understood that the disclosed core is not limited to inclusion in an ASIC, but can be included in any integrated circuit that requires coordinated timing and control of a plurality of SPI-controlled devices. Some examples of other cores include Field Programmable Gate Array (FPGA), System-On-Chip (SOC), and Application-specific standard part (ASSP). In addition, the core can include multiple cores that can be similar or different depending upon the specifics of the embodiment.

Figure 1:
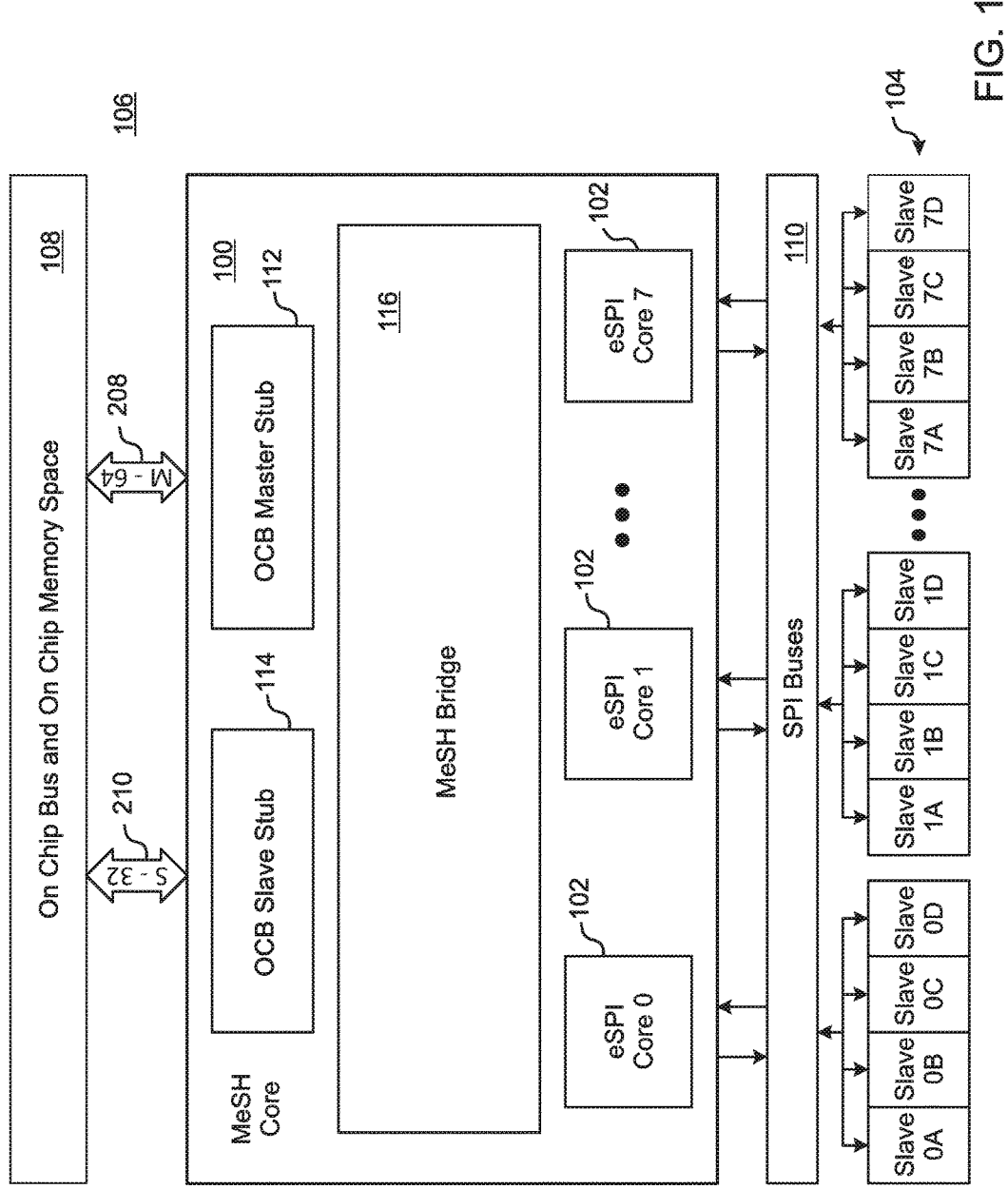
FIG. 1 is a block diagram illustrating the structure of an embodiment of the disclosed MeSH core.
Figure 2:
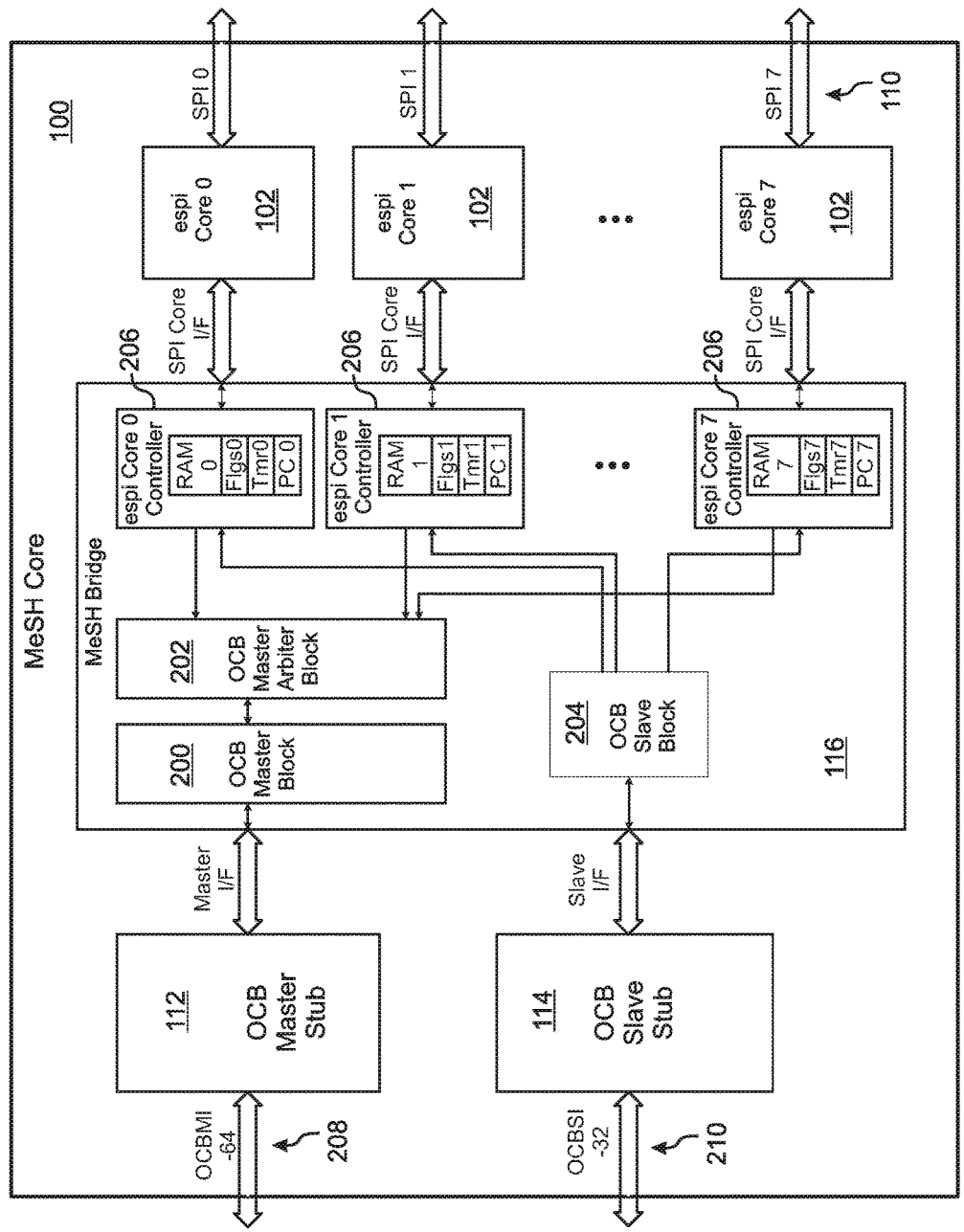
FIG. 2 is a block diagram illustrating internal structure of the MeSH core of FIG. 1.

With reference to the MeSH core environment diagram of FIG. 1 and the more detailed illustration of a MeSH core in FIG. 2, the disclosed core 100 contains a plurality of SPI masters 102, each of which is configured to initiate and control traffic on a corresponding SPI bus 110 for control of external serial peripheral "slave" interface devices 104. In one example each of the SPI Buses 110 is a set of host device transceivers allowing bidirectional data flow. In embodiments, the SPI masters 102 are referred to as "SPI cores," and in some embodiments as "enhanced" SPI cores, or eSPI cores.

Each of the eSPI cores 102 is controlled by a corresponding core controller 206, also referred to herein as an eSPI core controller, that is also included in the MeSH core 100. The core controllers 206 store and execute instructions and data that are required for use by the corresponding SPI cores 102. In embodiments, the MeSH core 100 can contain up to eight core controllers 206 and eight corresponding SPI cores 102.

The core controllers 206 can start separately, or they can be programmed or externally triggered to start simultaneously. Each core controller 206, once it is started, begins executing the instructions that are loaded in its memory, whereby the instruction set of the core controller 206 enables data transfer between resources that are external to the MeSH core 108, sometimes referred to herein as the On Chip Bus (OCB) and/or as OCB memory space 108, and the SPI slave devices 104. Each core controller 206 further includes interrupts and timers that can be used to coordinate the activities of the core controller 206 with the actions of other core controllers 206 and/or with other events within the ASIC 106. The coordination can be via any combination of signals exchanged between the eSPI core controllers 206 and via control signals received from external resources 108.

In the embodiment of FIG. 2, the core controllers 206 are part of a MeSH Bridge 116 that connects the OCB master 112 and slave 114 stubs with up to 8 enhanced SPI (eSPI) cores 102, each of which can communicate with a plurality of slave devices 104, for example up to four slave devices 104. In the embodiment of FIG. 2, the MeSH bridge 116 includes an OCB master block 200 and arbiter block 202, and an OCB Slave block 204, in addition to the core controllers 206. The OCB master 112 and slave 114 stubs communicate with corresponding OCB master (OCBMI) 208 and OCB slave (OCBSI) 210 interfaces that provide communication with an on chip bus ("OCB") 108. In the embodiment of FIG. 2, the OCBMI 208 is a 64-bit interface and the OCBSI 210 is a 32-bit interface.

Figure 3:
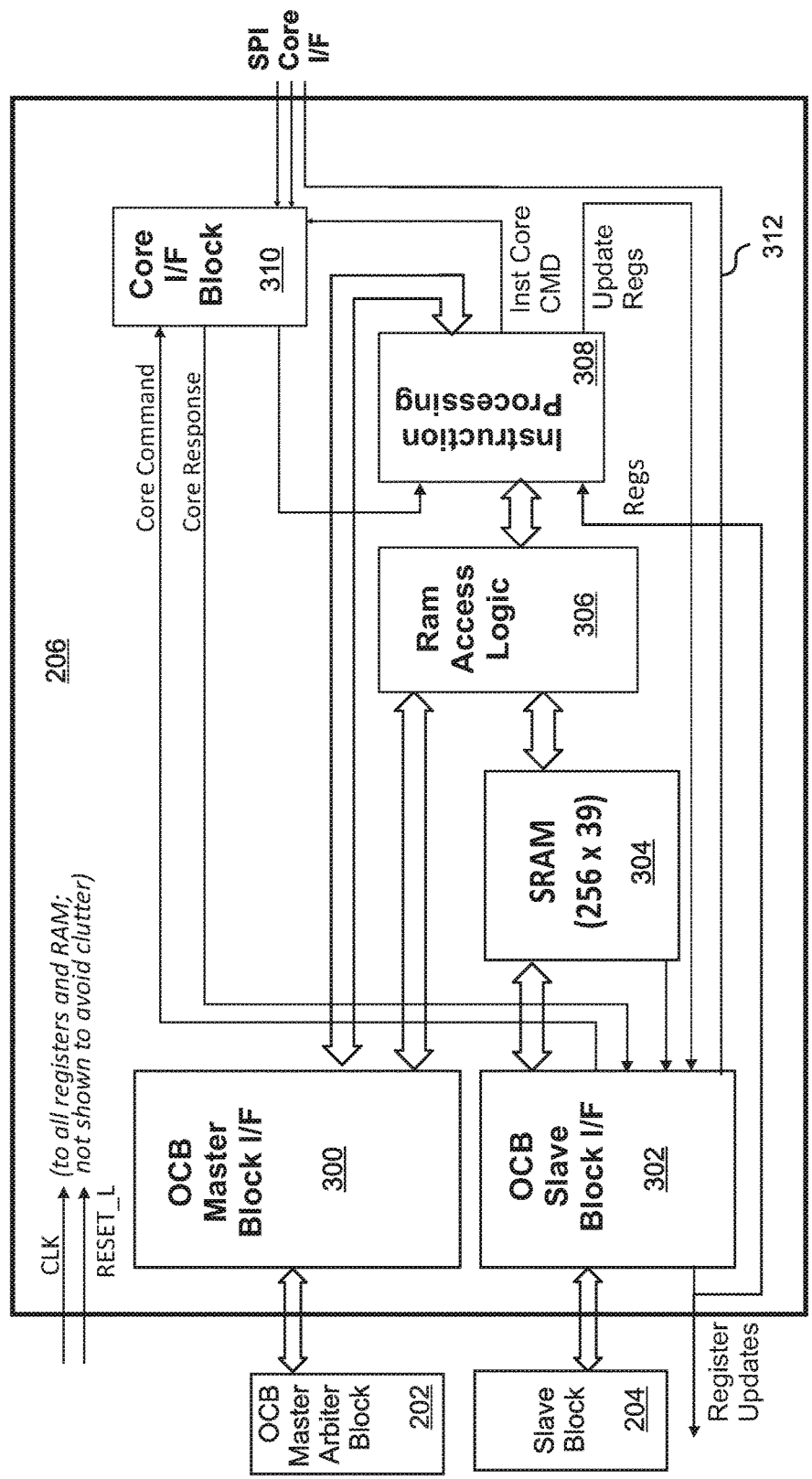
FIG. 3 is block diagram of an eSPI core controller in an embodiment.

FIG. 3 is a block diagram that illustrates details of a core controller 206 in an embodiment of the disclosure. In the illustrated embodiment, the core controller 206 includes an OCB master block interface 300 and OCB slave block interface 302 for communication respectively with the OCB master block 200 via a master arbiter block 202 and the OCB slave block 204. The core controller 206 further includes memory 304 and memory access logic 306, as well as an instruction processor 308 and an interface for communication with the associated SPI core 310.

As noted above, each of the eSPI core controllers 206 can independently control its corresponding SPI core 102 by executing instructions that are stored in its memory 304. The core controllers 206 are also able to synchronize their transactions by exchanging signals with each other. In embodiments, it is also possible for external resources 108 to directly synchronize transactions among multiple eSPI core controllers 206 and/or to bypass 312 the core controllers 206 and to interrogate and issue commands directly to the eSPI cores 102.

In embodiments, each core controller 206 handles all accesses to its associated eSPI Core 102. The accesses comes from one of two sources, namely via execution by the core controller of its instructions or via a "bypass mode" 312 via the OCB Slave Stub 114. OCB-Slave-sourced operations (direct reads or writes of eSPI Core resources) are termed "bypass operations," since they bypass 312 the instruction execution that is the primary function of the core controllers 206. In embodiments, accesses to the cores 102 by core controller instructions have priority over bypass operations, such that bypass operations 312 are passed to the eSPI Core 102 only when the core controller 206 is not executing a Core Register Read or Core Register Write instruction.

FIG. 4 is an address map for an eSPI core controller 206 in an embodiment of the present disclosure. It can be seen that the addresses provide access to flags (0x0010 to 0x0014), interrupts (0x0018 to 0x001C), timers (0x0020 to 0x003C), instruction storage (0x2000 to 0x3FFC), and access to the memory, registers, and other resources of the associated eSPI core (0x8000 to 0x9FFC).

In embodiments, each eSPI Core Controller 206 reports error and interrupt conditions which the MeSH Bridge 100 captures in either the Status Register (0x0010) or the Hardware Interrupt Register (0x0018). The MeSH interrupt activates when any condition is active and its corresponding enable bit in the Interrupt Enable Register (0x0014) and/or Hardware Interrupt Enable Register (0x001C) is set. In the illustrated embodiment, the MeSH Core's interrupt reporting is a three-tier mechanism, which includes a first tier of interrupts located in the cores 102, a second tier located in the core controllers 206, and a third tier located in the OCB slave block 204 or other MeSH bridge elements.

FIG. 5 summarizes the eSPI core controller instruction set for the embodiment of FIGS. 1-4. Note that the core FIFO operations only act on a single I/DS RAM address, and the #chars field in each case indicates the number of characters in the data word, where the first character is in the lsbs. In the illustrated embodiment, the instruction set of the MeSH core controller 206 includes:

Writes and reads to/from eSPI Core resources;
Writes and reads to/from OCB memory space;
Timer control (start, stop, capture);
Set and Clear of interrupt;
Write of General Purpose Flags;
Wait instructions (for Timer or General Purpose Flags);
Stop (immediate and conditional); and
Jump.

Additional features included in various embodiments are:
Independent instruction execution by each eSPI Core controller 206 to control each associated eSPI core 102;
Timer capability of the eSPI core controllers 206 to stagger instruction operation of any eSPI core controller 206 with any other eSPI core controller 206;
A common register, included for example in the OCB slave block 204, that can be used to start all core controllers 206 (to synchronize the core controllers 206, if desired);
A set of general purpose flags, included for example in the OCB slave block 204, which can also be used to report execution progress or resynchronize activity between eSPI core controllers 206;
Multi-tier status reporting with individual interrupt enables on each bit, including for example a first tier in the OCB master 200 and/or slave 204 block, a second tier in the core controllers 206, and a third tier in the eSPI cores 102; and
Bypass capability that allows direct access by external resources 108 (e.g. via the OCB) to resources of the eSPI Cores 102.

Data Transfer capabilities of the MeSH Core 100 in embodiments include:
Endianness control by the eSPI core controllers 206 to swap bits/bytes as needed by the eSPI Cores 102;
256×32 Instruction/Data Storage RAM 304 in each eSPI Core Controller 206 for control of a corresponding eSPI Core 102; and
OCB 108 Access, including:
  a. 64-bit OCB master connection 208 for data transfer with the Instruction/Data Storage RAM 304 of the eSPI controllers 206; and b. 32-bit OCB slave connection 210 for data transfers initiated by external resources 108.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A Multi-Serial Peripheral Interface controlling (MeSH) core, suitable for inclusion in an integrated circuit, the MeSH controlling core comprising:
   a plurality of Serial Peripheral Interface (SPI) buses suitable for control of serial peripheral interface devices that are external to the MeSH controlling core;
   for each of the SPI buses, an SPI master dedicated to controlling the SPI bus;
   for each of the SPI masters, an SPI core controller dedicated to controlling the SPI master;
   a bridge interconnecting the SPI core controllers; and
   a control interface configured to provide data and instruction communication between the bridge and resources that are exterior to the MeSH controlling core;
   wherein each of the SPI core controllers includes:
      memory;
      at least one interrupt;
      at least one timer; and
      an instruction processor that is configured to execute instructions stored in the memory, said instructions belonging to a core controller instruction set;
   wherein each of the SPI core controllers, under control of instructions from said instruction set, is configured to:
      transfer data between the SPI core controller and a corresponding SPI master;
      transfer data between the SPI controller and resources external to the MeSH controlling core;
      coordinate activities of the SPI core controller with activities of other SPI core controllers in the MeSH controlling core; and
      cause a plurality of the SPI core controllers to commence synchronized execution of the instructions stored therein.

2. The MeSH controlling core of claim 1, wherein the MeSH controlling core includes eight SPI masters.

3. The MeSH controlling core of claim 1, wherein each of the SPI masters is configured to control up to four SPI slave devices.

4. The MeSH controlling core of claim 1, wherein the core controller instruction set includes instructions that are further configured to stagger instruction operations of any of the SPI masters with any other of the SPI masters.

5. The MeSH controlling core of claim 1, further comprising a common register that can operate to initiate program execution of any combination of the core controllers so as to synchronize the core controllers with each other.

6. The MeSH controlling core of claim 1, further comprising at least one general purpose flag that is configured to report execution progress of at least one of the core controllers.

7. The MeSH controlling core of claim 1, further comprising at least one general purpose flag that can be used to resynchronize activity between a plurality of the core controllers.

8. The MeSH controlling core of claim 1, wherein the MeSH controlling core is configured to enable direct bypass communication between at least one of the SPI masters and at least one resource that is exterior to the MeSH controlling core.

9. The MeSH controlling core of claim 8, wherein the bypass communication is possible only at times when there is no data communication between the SPI master and its associated core controller.

* * * * *